April 1, 1930.   C. F. SCHULTIS   1,752,508
METHOD OF AND MACHINE FOR FLANGING PIPES
Filed Aug. 9, 1927   2 Sheets-Sheet 1
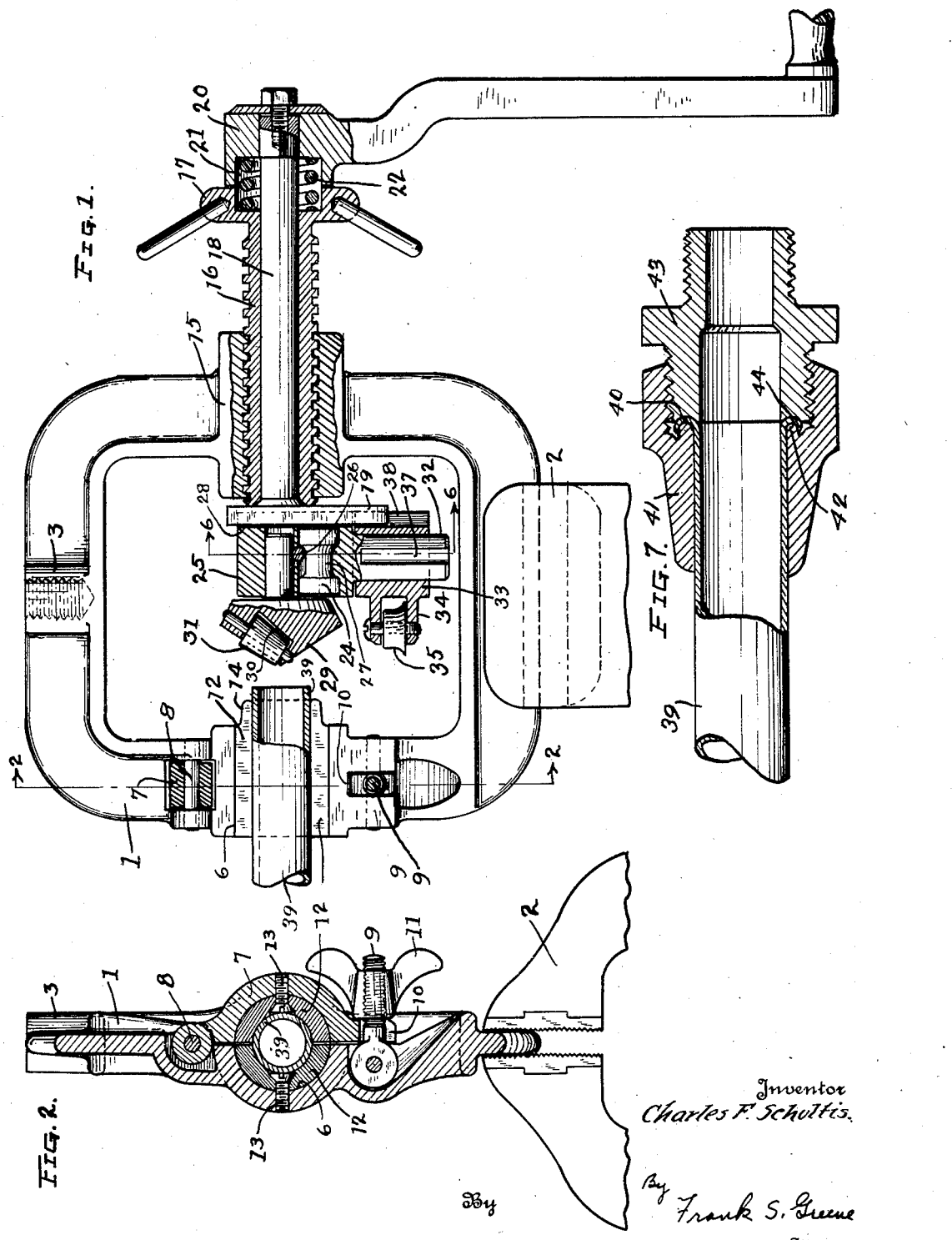
Inventor
Charles F. Schultis.
By Frank S. Greene
Attorney April 1, 1930.  C. F. SCHULTIS  1,752,508
METHOD OF AND MACHINE FOR FLANGING PIPES
Filed Aug. 9, 1927  2 Sheets-Sheet 2
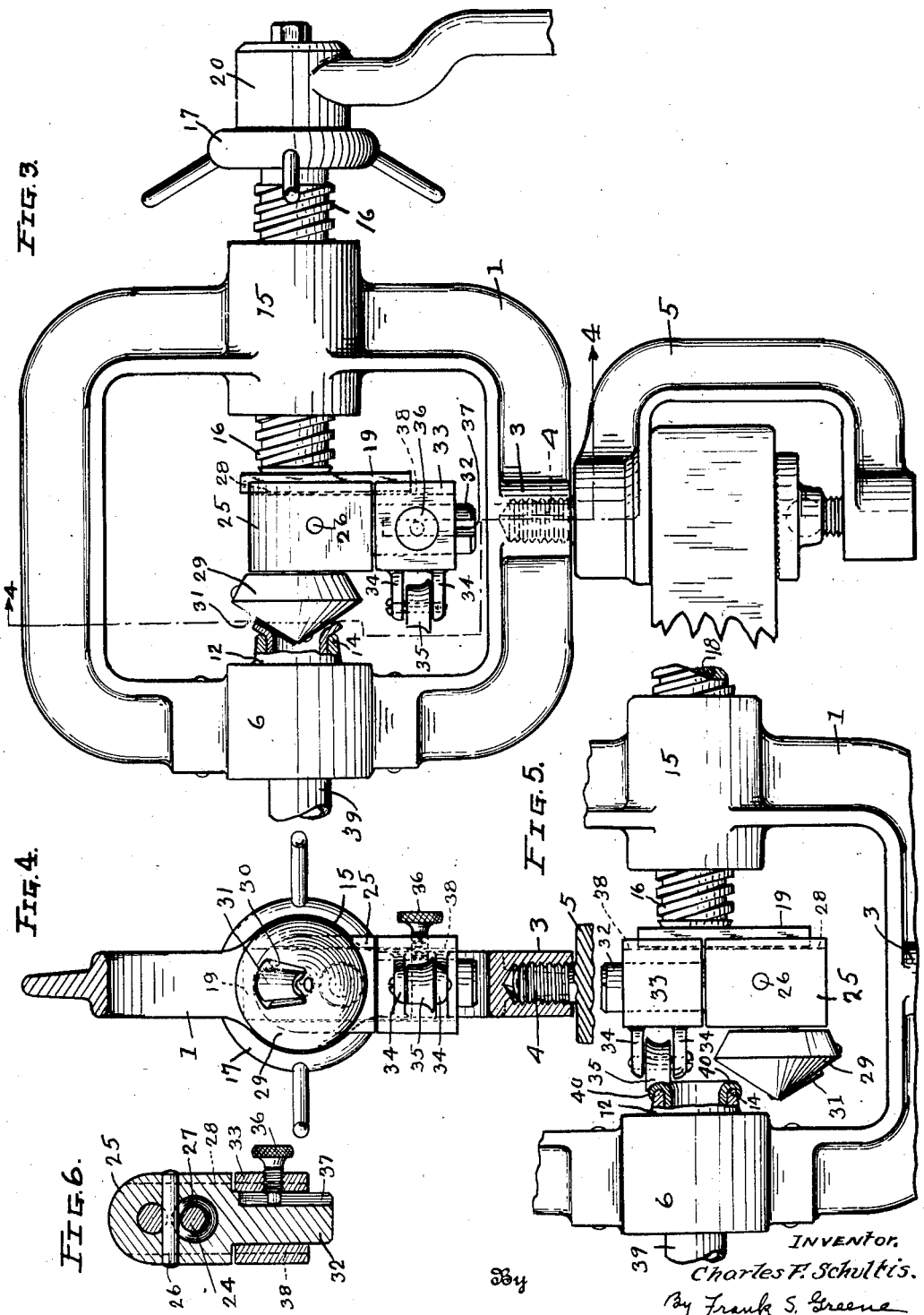

Patented Apr. 1, 1930

1,752,508

UNITED STATES PATENT OFFICE

CHARLES F. SCHULTIS, OF CLEVELAND, OHIO, ASSIGNOR, BY DIRECT AND MESNE ASSIGNMENTS, OF ONE-FOURTH TO ISADORE HERZBRUN AND ONE-FOURTH TO S. W. GOLDMAN, BOTH OF CLEVELAND, OHIO

METHOD OF AND MACHINE FOR FLANGING PIPES

Application filed August 9, 1927. Serial No. 211,718.

This invention relates to a method of and machine for flanging pipes and has for its object to provide a method of and machine for rolling a reversely curved hook flange upon the end of a piece of seamless tubing.

An object of the invention is to provide a machine having a spindle carrying a plurality of flanging rolls adapted to be successively brought into pipe engaging position.

A further object is to provide a machine having spindle feeding means and separate spindle driving means in which the spindle driving means may be utilized to quickly feed the spindle to and from the work and in addition to provide means by which the connection between the spindle feeding means and spindle driving means is automatically rendered ineffective by end thrust on the spindle so that the feeding means may be operated by the driving means to move the spindle to and from work engaging positions and independently of the spindle driving means during operation on the work.

A further object is to provide a pipe flanging machine capable of forming flanges on tubing of extremely small diameter.

A further object of the invention is to provide a method of forming on relatively stiff thin walled metal tubing such as copper, brass, or steel tubing, a reversely curved hook flange which has outer and inner surfaces adapted to accurately conform to opposed concave and convex annular seats on complemental coupling members.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Fig. 1 is a side elevation of the machine with the tool head and spindle supporting sleeve shown in section.

Fig. 2 is a section taken on the line indicated at 2—2 in Fig. 1 showing the tube clamping means.

Fig. 3 is a side elevation of the machine showing the machine mounted upon a bench clamp and showing one of the flanging rolls in engagement with the tube.

Fig. 4 is a section taken on the line indicated at 4—4 in Fig. 3.

Fig. 5 is a fragmentary side elevation of the machine showing the final flanging operation.

Fig. 6 is a section taken on the line indicated at 6—6 in Fig. 1.

Fig. 7 is a sectional view showing the coupling in which the flanged tubing is used.

As shown in the accompanying drawings, the machine is supported in a rectangular frame 1 in the form of a continuous bar which may be clamped in a vise 2. The frame is provided on one side with a boss 3, which is tapped and threaded to screw on to a threaded projection 4 of a bench clamp 5, the frame being reversible with respect to the mechanism carried thereby so that either the vise or bench clamp may be employed to support the same. On one side thereof the frame 1 is provided with a means for clamping a piece of tubing to be flanged, and this clamping means comprises a semi-cylindrical recess 6 formed in the frame 1, and a pivoted member 7 connected to the frame 1 by a hinge 8 and having a semi-cylindrical recess complemental to the recess 6. The frame 1 carries a pivoted bolt 9 beneath the clamping portion 7 and this bolt engages in a slot 10 in the lower end of the hinged clamping member 7 and carries a wing nut 11 by which the clamping members may be securely fastened together. Within the clamping members, there is secured a two-part bushing 12, each section of which is secured to one of the clamping members by means of a screw 13. The bushing 12 has an internal diameter corresponding to the external diameter of the tube to be flanged and at its inner end, has a projecting rounded rib 14.

Directly opposite the tube clamp, the frame 1 is provided with an internally threaded boss 15 which receives an externally threaded sleeve 16, which has a handwheel 17 fixed to its outer end. The boss 15 is coaxial with the tube receiving bushing 12 and the sleeve 16 has a spindle 18 extending therethrough and rotatable therein. The spindle 18 has a plate 19 attached to its inner end and bearing against the inner end of the sleeve 16 and at its outer end the spindle 18 has fixed thereto a driving member 20, the inner face of the driving member bearing against the outer end of the sleeve 16. In so far as the present invention is concerned, the specific means employed for imparting rotation to the spindle is immaterial, however, as herein shown, the driving member 20 is in the form of a handcrank by means of which the spindle may be rotated in either direction. The contiguous faces of the sleeve 16 and member 20 are counterbored to provide a chamber 21 in which is mounted a compression coil spring 22 which surrounds the spindle and bears against the sleeve 16 at one end and the driving member 20 at the other end. The spring 22 forms a frictional driving connection between the member 20 and the sleeve 16, so that the sleeve 16 will be rotated when the frictional resistance to the turning movement of the sleeve is less than the frictional resistance offered by the spring 22 to the turning of the spindle within the sleeve.

The plate 19 at the inner end of the spindle carries a pin 24 which is parallel with the axis of the spindle and eccentric thereto, and, rotatably mounted upon this pin, is a tool head 25 which has a transverse pin 26 engaging in a wide circumferential groove 27 in the pin 24, the pin 26 permitting a limited movement of the head endwise of the pin. The plate 19 is elongated transversely of the spindle and the head 25 is provided on its outer face with a groove 28 in which the plate 19 fits. When the plate 19 lies in the groove 28 of the head, a driving connection is established between the spindle and the head so that the head is constrained to rotate with the spindle. The groove 27 and pin 24 permit the head to have a movement endwise of the pin sufficient to free the plate 19 from the groove 28 and permit the head to be rotated 180° and be re-engaged with the plate.

The tool head 25 has rigidly but detachably secured thereto in any suitable manner, a conical head 29, the apex angle of which is preferably obtuse. The conical head 29 is provided with a transverse notch 30 extending at right angles to a pitch line of the cone and, mounted in the notch 30, there is a roll 31 whose axis is parallel to a pitch line of the cone and the periphery of which projects slightly beyond the surface of the cone. For flanging tubes of small diameter, the inner side of the notch 30 extends inwardly from substantially the apex of the cone and the roll 31 is positioned with its forward inner edge portion substantially at the axis of the cone so that the roll can have rolling contact with the inner edge of the wall of a small tube.

The head 25 is provided with an integral pin 32 which extends at right angles to the axis of the spindle and has a head 33 slidably mounted thereon. Projecting from the outer face of the head 33 are parallel ears 34 which extend substantially parallel to the axis of the spindle and between these ears there is journaled a concave roll 35, the axis of which is radially disposed with respect to the spindle. The head 33 is provided with a set screw 36, which engages in a longitudinal groove 37 in pin 32, so that the head 33 may be adjusted toward and from the axis of the spindle and is positively held against turning movement on the pin 32 and with a groove 38 on its outer face which slidably receives the plate 19.

In the operation of the machine, a piece of seamless tubing 39 is clamped to the bushing 12 with sufficient length of the tubing projecting beyond the inner end of the bushing to form a flange of the desired width. The tool head 25 is positioned upon the plate 19 with the conical roll carrying head 29 coaxial with the spindle 18 and tubing 39. The handle 20 is then turned in a direction to advance the screw sleeve 16 toward the tubing so that the spindle and sleeve are moved bodily until the roller 31 on the conical head comes into engagement with the edge of the tubing. As soon as end thrust is exerted upon the sleeve 16, the frictional resistance to the turning of the external threads thereof within the boss 15, becomes greater than the frictional resistance offered by the spring 22 to the turning of the spindle with respect to the sleeve, so that forward movement of the sleeve ceases.

During the operation of the flaring roll 31 upon the tubing, the sleeve may be gradually advanced toward the work by means of the hand wheel 17. As soon as the projecting end of the tube has been flared to the angle of the roller 31, the sleeve and spindle are retracted to a position clear of the tubing and the head 25 is reversed on the plate 19 bringing the conical head 29 to a position entirely outside the flange of the tubing and the roll 35 to a position adjacent the axis of the tubing, the head 33 being adjusted on the pin 32 to a position such that the distance of the roller 35 from the axis of the spindle corresponds to the diameter of the tubing. The roller 35 is brought into engagement with the flange of the tubing by rotating the handle 20 which will rotate the sleeve 16 in a direction to feed the spindle toward the work until the roller comes into engagement therewith, whereupon the spindle will be rotated independently of the sleeve and will be fed toward the work by turning the hand wheel 17 to cause the concave roll 35 to gradually roll the flange of the tubing into conformity with the rib 14 of the bushing and to gradually roll the outer face of the flange into conformity with the concave contour of the roll, thereby forming a reversely curved hook flange 40 on the end of the tubing as shown in Fig. 5 of the drawing. During its operation, the roll 35 bears against the outer edge of the flange and in rolling the flange down upon the rib 14, metal is forced inwardly from the outer edge of the flange, redistributing the metal in the flange and thickening portions thinned by the stretching of the tube wall, so that a flange is formed which is tapered to a relatively sharp point at its outer edge but which, inwardly of the tapered edge, is of substantially uniform thickness.

The machine of the present invention is designed particularly for flanging seamless tubing formed of relatively stiff metal such as brass, copper or steel and the reversely curved hook flange is for the purpose of enabling a fluid tight and rigid coupling to be made at an end of the tubing. As shown in Fig. 7 of the drawing, the tube 39 fits into a coupling member 41, which has an axial bore corresponding to the external diameter of the tubing and an internally threaded counterbore which has a rib 42 at the bottom thereof surrounding the tube and of the same size and shape as the rib 14 of the bushing upon which the flange of the tube has been rolled so that the flange 40 of the tubing fits accurately upon the rib. The coupling also has a threaded member 43 which screws into the coupling member 41, the coupling member 43 having an internal bore corresponding to the internal bore of the tubing and at the end thereof which engages the bottom of the counterbore has a concave annular seat 44 which has a transverse curvature corresponding exactly to the longitudinal curvature of the surface of the concave roll 35, so that the seat accurately fits upon the outer face of the hook flange.

A number of cylindrical bushings may be provided which have an external diameter corresponding to the diameter of the socket formed by the complemental recesses of the clamping members and of internal diameters corresponding to the diameters of tubes of various sizes. A single flaring roll and the finishing roll may be used upon tubes of different diameters, but the conical roll carrying head 29 may be replaced with a similar head of larger or smaller size and the head 33 may be replaced with a similar head having a roll of a different shape.

It will be apparent that the bushing 12 may have a rib which is rounded to any desired transverse curvature and that by employing the proper bushings, flaring and finishing rolls, tubes of any size from one of very small diameter to the largest within the capacity of the machine may be flanged to accurately fit between the opposed concave and convex seats of a given coupling.

What I claim is:

1. A tube flanging machine comprising a spindle, means for rigidly holding a tube in axial alinement with said spindle, a plurality of flanging rolls carried by said spindle, means for rotating the spindle, and means for simultaneously adjusting one roll inwardly to tube engaging position and another outwardly out of tube engaging position.

2. A tube flanging machine comprising a spindle, means for rigidly holding a tube in axial alinement with said spindle, a head pivotally secured to said spindle, a pair of flanging rolls mounted on said head, means for securing said head against rotation on the spindle with either of said rolls in tube engaging position, and means for rotating the spindle.

3. A tube flanging machine comprising a spindle, means for rigidly holding a tube in axial alinement with said spindle, means for rotating the spindle, a head pivoted to the spindle to swing about an axis parallel to the axis of the spindle and offset with respect thereto, and a plurality of flanging rolls carried by said head.

4. A tube flanging machine comprising a spindle, means for rigidly holding a tube in axial alinement with said spindle, a head pivoted to the spindle to swing about an axis parallel to the axis of the spindle and offset with respect thereto, a roll inclined with respect to the axis of the spindle, and a concave roll having its axis radially disposed with respect to said spindle, said rolls being mounted on said head on opposite sides of said pivotal axis.

5. A tube flanging machine comprising a spindle, means for rigidly holding the tube with an end thereof adjacent an end of the spindle and in axial alinement therewith, means for rotating said spindle and feeding the same axially toward said tube, and a flanging roll carried by the spindle at its forward end and inclined rearwardly with respect to said axis, said roll having its foremost end portion substantially at the axis of the tube and spindle.

6. A tube flanging machine comprising a spindle, means for rigidly holding the tube with an end thereof adjacent an end of the spindle and in axial alinement therewith, means for rotating said spindle and feeding the same axially toward said tube, a conical head at the forward end of said spindle, said head being coaxial with the spindle and having its point toward said tube, a transverse notch in said head and a freely rotatable roll mounted in said notch with its outermost longitudinal edge substantially parallel with and outside a pitch line of the cone.

7. A tube flanging machine comprising a spindle, means for rigidly holding the tube with an end thereof adjacent an end of the spindle and in axial alinement therewith, means for rotating said spindle and feeding the same axially toward said tube, a conical head at the forward end of said spindle, said head being coaxial with the spindle and having its point toward said tube, a transverse notch in said head and a freely rotatable roll mounted in said notch with its outermost longitudinal edge substantially parallel with and outside a pitch line of the cone, the foremost end portion of said roll lying substantially at the axis of the tube.

8. A tube flanging machine comprising a spindle, means for rigidly holding the tube with an end thereof adjacent an end of the spindle and in axial alinement therewith, means for rotating said spindle and feeding the same axially toward said tube, a transversely elongated member fixed to the forward end of the spindle, a pivot pin carried by said member and projecting forwardly therefrom parallel to the axis of the spindle and offset with respect thereto, a head rotatably mounted on said pin and movable endwise thereof, a groove in the rear face of said head in which said elongated member fits, and a pair of flanging rollers carried by said head and positioned on opposite sides of said pin.

9. A tube flanging machine comprising a spindle, means for rigidly holding the tube with an end thereof adjacent an end of the spindle and in axial alinement therewith, means for rotating said spindle and feeding the same axially toward said tube, a transversely elongated member fixed to the forward end of the spindle, a pivot pin carried by said member and projecting forwardly therefrom parallel to the axis of the spindle and offset with respect thereto, a head rotatably mounted on said pin and movable endwise thereof, a groove in the rear face of said head in which said elongated member fits, and a pair of flanging rollers carried by said head and positioned on opposite sides of said pin, one of said rollers being mounted in a fixed position with respect to said head and the other being adjustable on the head toward and from the axis of the spindle.

10. The herein described method of forming on relatively thin stiff-walled metal tubing, a reversely curved hook flange having an outer face which conforms to a transversely concave annular seat on one coupling member and whose inner face conforms to a transversely convex annular seat on a complemental coupling member which comprises expanding an end of the tubing and rolling the expanded end portion against an annular die encircling the tubing inwardly of the expanded end portion and having a flange engaging face corresponding in size and shape to the convex annular seat of the last mentioned coupling member with a roller whose surface has a longitudinal curvature corresponding to the transverse curvature of the concave annular seat of the first mentioned coupling member.

In testimony whereof I affix my signature.

CHARLES F. SCHULTIS.